(12) United States Patent
Phillips et al.

(10) Patent No.: US 6,649,269 B1
(45) Date of Patent: Nov. 18, 2003

(54) INTERLAYER COMPOSITE STRUCTURE FOR LAMINATED GLASS WITH CONTROLLED BONDING BETWEEN THE LAYERS AND THE PROCESS FOR THE PRODUCTION OF THE INTERLAYER STRUCTURE

(75) Inventors: Thomas Richard Phillips, Vienna, WV (US); Guenter Klafka, Hamm (DE); Ingo Kueppenbender, Welver (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/069,191

(22) PCT Filed: Jun. 25, 1999

(86) PCT No.: PCT/US99/14394

§ 371 (c)(1),
(2), (4) Date: Nov. 13, 2001

(87) PCT Pub. No.: WO01/00407

PCT Pub. Date: Jan. 4, 2001

(51) Int. Cl.[7] ................ B32B 17/10; B32B 27/30; B32B 31/12

(52) U.S. Cl. ............... 428/437; 156/308.6; 156/308.8; 428/141; 428/436; 428/501; 428/524; 428/525

(58) Field of Search ................ 428/141, 436, 428/437, 501, 524, 525; 156/308.6, 308.8

(56) References Cited

U.S. PATENT DOCUMENTS 5,766,755 A * 6/1998 Chaussade et al. ......... 428/332

FOREIGN PATENT DOCUMENTS

EP   0710545 A1 * 11/1995

* cited by examiner

Primary Examiner—D. S. Nakarani
(74) Attorney, Agent, or Firm—Kevin S. Dobson

(57) ABSTRACT

A process for the production of multi-ply polyvinyl butyral interlayer having improved separation force whereby multiple plies are combined in a tension controlled process comprising overlaying a layer of polyvinyl butyral sheeting having water drops on its surface with a second layer of polyvinyl butyral sheeting.

5 Claims, 2 Drawing Sheets

INTERLAYER COMPOSITE STRUCTURE FOR LAMINATED GLASS WITH CONTROLLED BONDING BETWEEN THE LAYERS AND THE PROCESS FOR THE PRODUCTION OF THE INTERLAYER STRUCTURE

BACKGROUND OF THE INVENTION

The present invention relates to an improved interlayer product for the preparation of laminated safety glass. More particularly, the invention relates to an interlayer product for laminated safety glass whereby multiple layers of film having the desired properties of thickness, dimensional stability and surface pattern are combined, by applying water drops as an array in the transverse and machine directions.

In laminated safety glass used in window glass for buildings and such, it is not uncommon for the laminator to use thicker interlayer than typically used in automotive applications, which is nominally 0.76 mm (30 mils) thick. Further, it is not unusual to combine multiple layers of interlayer to achieve a thicker product for enhanced structural and acoustic properties.

The extrusion process for the production of thick interlayer, that is, greater than 0.76 mm (30 mils), requires high throughput rates and low line speeds that are not cost effective. The process results in product with deficiencies in dimensional stability, such as shrinkage, difficulty in winding and cutting, additional manufacturing transitions and problems in generating the surface pattern necessary for proper de-airing when laminating the glass/interlayer construction.

Typically multi-ply product as described in our Application PCT/US98/26425, filed Dec. 11, 1998, which is incorporated by reference herein, (referred to hereinafter as Application FA-0782), while overcoming the problems of extrusion noted above, does not always process well with automated unwinding equipment because the lightly bonded plies can be separated due to nip roll misalignments and unmatched speeds within the equipment.

Further, other types of surface patterns, such as, embossed and serrated, do not work well with the multi-plying process as described in Application FA-0782.

It has now been found if drops of water are deposited in an array in the transverse and machine directions when combining the interlayer plies by a process as described in FA-0782, the resulting structure is more robust and may be handled as an integral unit in any type of lamination equipment without separating.

Further, by appropriately selecting the array and size of the water drops, a broad range of bonding strengths between the sheets can be achieved while still providing adequately un-bonded or lightly bonded areas for de-airing in the lamination process.

Further, because water is not an intrusive material to polyvinyl butyral resin (PVB), the water drops are completely absorbed and diffused and do not create subsequent processing problems.

Further, the technique can be applied to many surface pattern type of PVB sheeting, although bonding is affected by the degree of roughness.

SUMMARY OF THE INVENTION

In the process of the present invention, two or more rolls of sheeting comprising polyvinyl butyral as the primary component with plasticizers as the secondary component are simultaneously unwound and rewound together. The process is operated under controlled tension, line speed and temperature so that the edges of the respective layers are aligned and roll formation is normal, the tension on the respective sheets is equal, thickness is maintained and entrapped air is minimized.

Further, prior to the combining of the sheeting at windup, water is applied as an array of drops through a dosing apparatus in the transverse and machine directions of the sheeting. The application of the water is made by pulsing the dosing units so as to apply the drops periodically in the machine direction. The resulting product is used to produce laminated safety glass with thick interlayer construction.

More particularly, by varying the number of dosing units in the cross-web direction and the pulsing frequency to control the machine direction application, a composite structure with variable controlled bonding between the layers can be produced.

DETAILED DESCRIPTION OF THE INVENTION

Figure 1:
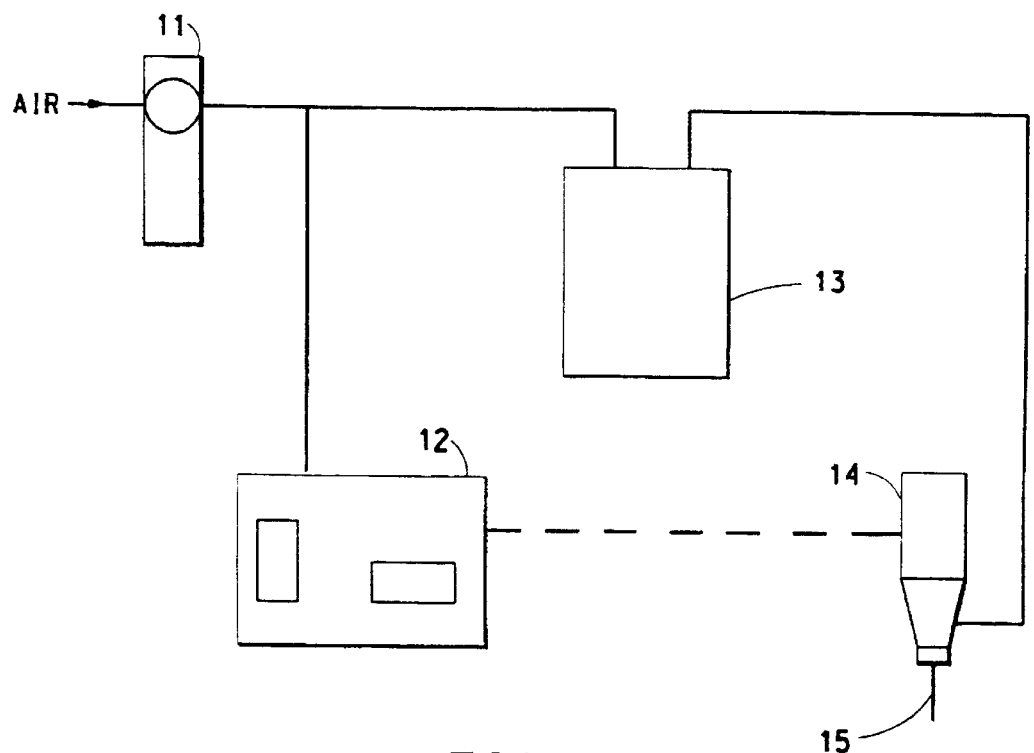
FIG. 1 is a schematic of a water dosing apparatus.

In the laminated glass industry, especially in architectural applications, it is often the case that multiple layers of polyvinyl butyral sheeting interlayer are used to achieve specific structural properties of the final construction. The final thickness of the multiple layers is completely dependent on the strength and acoustic properties desired.

Polyvinyl butyral sheeting interlayer can be produced by extrusion processes well known in the art, however, there are advantages to producing interlayer substantially thicker than 0.76 mm (30 mils), the standard for automotive safety glass applications, by this method. These include high throughput rates but low line speeds, deficiencies in dimensional stability, such as shrinkage, difficulty in winding, time consuming transitions and waste generation, and difficulty in generating some types of surface pattern necessary for proper de-airing in the glass lamination process.

Methods well documented in the art used to create the surface pattern on interlayer for making laminated safety glass include melt fracture at the die lips, embossing and extrusion through custom dies with serrated lips.

When multiple layers of melt fracture pattern polyvinyl butryal sheeting interlayer, such as that sold under the Butacite®, trademark for E.I. duPont de Nemour's PVB sheeting, are combined in a process such as is described in Application FA-0782, the resulting composite structure has bonding strengths typically between 0.6–1.8 Newtons per meter of sheet width when tested with a spring scale. The light bonding of the layers is the result of mechanical locking of the random melt fracture surface pattern and is a function of the pattern roughness. That is, smoother pattern sheeting has greater bonding than rougher pattern sheeting because of greater contact of the respective surfaces.

The composite behaves as an integral unit under most processing conditions used for making laminated glass. However, under some automated unwinding conditions, where nip roll misalignment, uneven speeds resulting in drag on the sheeting or asymmetric forces, for example, sheet slitting, occur, separation of the plies can take place. When this behavior is observed, substantially higher bonding strengths are typically necessary to prevent separation.

Other surface pattern types, such as, embossed and serrated, do not bond well or at all when combined in a process such as described in Application FA-0782.

It has now been shown that thick polyvinyl butyral sheeting interlayer with enhanced robustness can be produced by combining multiple thinner layers in a controlled winding operation, such as, described in Application FA-0782, along with the application of water drops in an array in the transverse and machine directions of the sheeting. The water drop softens the polyvinyl butyral at the point of application, thereby increasing tackiness. The time to achieve the desired level of bonding between the plies is usually attained within 24 hours, a time typically seen in storing PVB for commercial applications and the tackiness does not decrease with longer storage times.

Further, by this technique, any type or combination of surface pattern polyvinyl butyral sheeting can be combined. However, the $R_z$, the ten-point peak height average as defined in the American National Standard B46.1-1985, should be less than 50 micrometers for effective bonding, preferably in the range from about 15 to 45 micrometers.

Moreover, because water is not an intrusive material to polyvinyl butyral, the water that is applied is ultimately absorbed and diffused within the sheeting, thereby avoiding any processing problems during glass lamination. In addition, the surface pattern on the exterior of the plies is not disturbed.

The water dosing apparatus shown in FIG. 1 delivers water drops a pulsed mode so that depending on the bonding strength of the plies desired, the number of dosing units and the pulsing frequency can be varied and controlled. Dosing apparatus are commercially available from companies such as EFD® Inc. A schematic of a typical apparatus is shown in FIG. 1. The control unit 12 can be adjusted to vary the frequency and duration of the application through the dosing valve 14 while dosing tip 15 can be used to regulate the size of the drop. Air pressure controlled by regulator 11 is typically used to actuate the dosing valve 14 and to pressurize the fluid reservoir 13. The amount of water applied may vary from about 0.5 to 30 micro-liters per drop, preferably in the range 2.5 to 10 micro-liters per drop.

Figure 2:
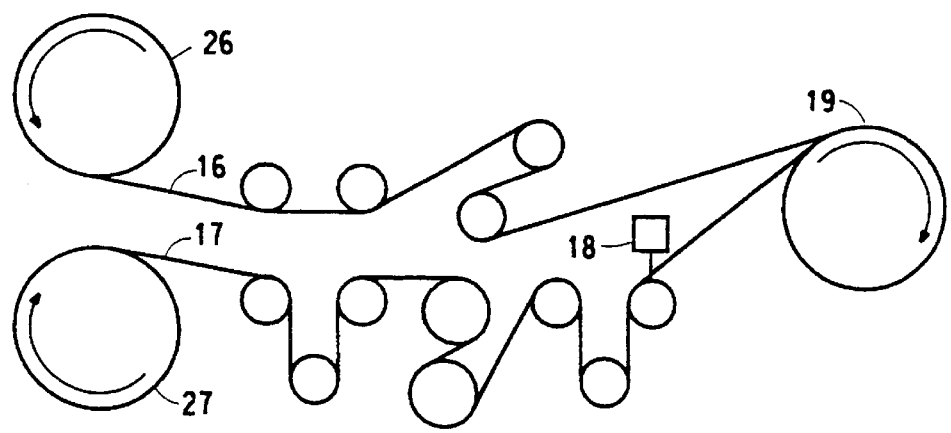
FIG. 2 is a side view schematic of an interlayer plying line showing the point of application of water by a water dosing apparatus.

In carrying out the process of the current invention according to FIG. 2, interlayer rolls 26 and 27 are unwound and conveyed with tension (i) unwinding a first layer of plasticized polyvinyl butyral 17 from a first roller at a line speed of 10–50 meters/min. and at a temperature of 5–35° C. and at an unwind tension of 4–70 Newton meter/meter of sheet width to form a first web;

(ii) simultaneously unwinding at least one additional layer of plasticized polyvinyl by 16 from a second roller at a line speed of 10–50 meters/min. and at a temperature of 5–35° C. and at an unwind tension of 4–45 Newton meter/meter of sheet width to form at least a second web; and (iii) combining layers (i) and (ii) on a windup roller 19 to form an aligned multilayer composite structure.

Thus, PVB sheeting between 0.38 mm to 1.52 mm (15 and 60 mils)) may be utilized with the tension varying accordingly. The process may further comprise unwinding a protective sheet of polyolefin from an unwind roller not shown) at a tension of 2 to 5 Newton meter/meter simultaneously with the first and second rollers and, in step (3), combining layers (i) and (ii) with the protective sheet as the top layer on the windup roller 19 to form an aligned multilayer composite structure having a protective sheet of polyolefin.

Prior to being combined at the windup, water drops are applied through the dosing apparatus 18 shown in FIG. 1. The number of actual dosing units is dependent on the number of positions in the cross-web, transverse direction that one wants to apply the water drops. Further, the frequency at which the drops are applied in the machine direction is controlled by the dosing control unit 12. Preferably the water drops are of uniform size and are distributed in a uniform array 10 on the sheeting. It is only necessary apply water to the surface of one of the webs which are to be plied. By adjusting the number of units and the frequency, the bonding of the plies can be controlled to forces between nominally 1.0 Newtons per meter and greater than 150 Newtons per meter of sheet width when tested with a spring scale.

Figure 3:
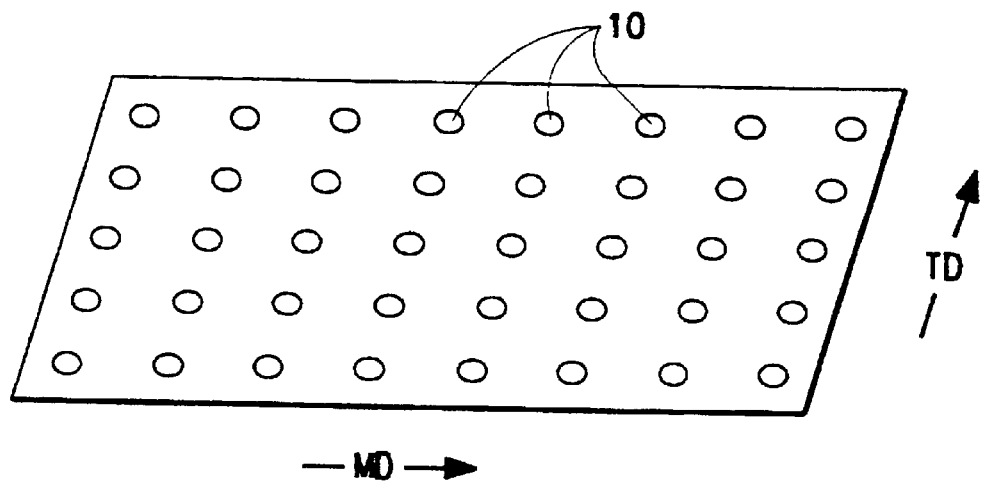
FIG. 3 is a representation of the water drop array as applied to the interlayer.

FIG. 3 is a representation of a water drop array 10 as might be applied to ply sheeting. As can be seen, the number and frequency of the applied water drops covers only a small portion of the available surface area thereby affording sufficient area for de-airing. The array 10 preferably is substantially uniformly distributed in the machine direction (MD) and transverse direction (TD). The array is a critical parameter in glass lamination because trapped air will result in bubble formation in the final product rendering it unusable.

The invention is further illustrated by the following examples.

TEST METHODS

Separation Force. Method 1: A spring scale, sometimes referred to as a fish scale, is attached to the top ply of a two-ply construction. The top ply is pulled away at either a 90 degree or 180 degree angle. The separating force, expressed in Newtons per meter of sheet width, is calculated from the maximum scale deflection measured in kilograms and the test sample width. This technique can be applied to either flat laboratory samples or to samples still wound on a multi-ply roll.

Separation Force, Method 2: 0.0254 meters (1 inch) wide by nominally 0.1524 meters (6 inches) long samples are tested using a Peel Tester, Model SP-102B-3M90, sold by Instrumentors, Inc. To minimize extension of the bottom ply when peeling, the bottom ply of the test sample is held in place on a piece of glass by double stick tape. The test samples are peeled at a 90 degree angle.

Pattern: Tested according to American National Standard B46.1-1985

EXAMPLES 1 & 2

Figure 4:
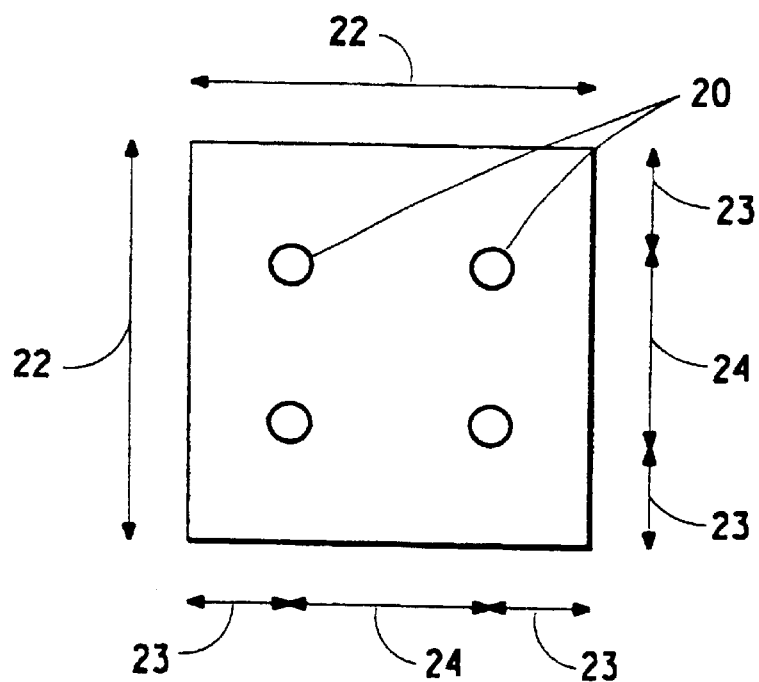
FIG. 4 is the array used for testing one type of laboratory sample.

To a 33-33 cm piece of melt fracture pattern Butacite® PVB sheeting, with a $R_z$ value of 25.7 micrometers and a $S_m$ value of 46.2 micrometers, were applied 4 drops of water in an array as shown in FIG. 4. The volume of each drop of water 20 was 2.5 micro-liters. Dimensions shown in FIG. 4 are 33 cm for distances 22, 15 cm for distances 24, and 9 cm for distances 23. The water was applied with a micro-liter syringe such as are sold by Hamilton. A second piece of the same PVB sheeting was immediately placed on top of the sheet to which water had been applied. A piece of 33×33 cm glass was place on top of the composite structure to simulate roll wrap forces and then the test unit conditioned before testing.

The resulting two-ply structure was tested for bonding according to Method 1 at a 90 degree peel angle. The results show bonding forces in excess of 90 Newtons per meter of sheet width indicating strong bonding between the plies.

Other samples prepared identically were laminated to glass according to typical glass laminating procedures including autoclaving. The resulting laminates were visually examined for defects, specifically, bubbles at the points of application of the water. None were found indicating lamination acceptability.

Table 1 summarizes these results.

COMPARATIVE EXAMPLES A & B

Two 33×33 cm pieces of the same melt fracture pattern Butacite® PVB sheeting described above were processed in a nip process according to Application FA-0782. The resulting two-ply structure was conditioned with a piece of 33×33 cm glass placed on top to simulate roll wrap forces as described above and then tested for bonding according to Method 1 at a 90 degree peel angle. The results show bonding forces between 0.6–1.8 Newtons per meter of sheet width.

Similar samples were laminated to glass according to typical glass laminating procedures including autoclaving. The resulting laminates were visually examined for defects as described above. No defects were observed indicating lamination acceptability.

Table 1 summarizes these results.

TABLE 1

| Example | Treatment Temp., C | Nip Pressure, bars | 2.5 micro-liter drops | Condition. Temp., C | Condition. Time, hrs. | Bonding, N/m | Laminate Quality |
| --- | --- | --- | --- | --- | --- | --- | --- |
| 1 | 20 | NA  | 4   | 20  | 6   | >150 | OK |
| 2 | 10 | NA  | 4   | 10  | 6   | 90  | OK |
| A | 20 | 2.8 | NA  | 20  | 6   | 0.6–1.8 | OK |
| B | 10 | 2.8 | NA  | 20  | 6   | 0.6–1.8 | OK |

EXAMPLES 3 & 4

Rolls of 2-ply composite PVB sheeting with a $R_z$ value of 26.2 micrometers and a $S_m$ value of 41.4 micrometers, prepared according to the present invention with a water drop array of 15 cm in both the transverse and machine directions and a water drop volume of 5 micro-liters per drop, were tested on manual and automated unwinding equipment. The multi-ply rolls were tested according to Method 1 for bonding at seven positions across the web. The bonding strengths were between 90–150 Newtons per meter of sheeting width.

Unwinding on manual and automatic unwinding equipment was successful as no separation of the plies occurred. Results are summarized in Table 2.

COMPARATIVE EXAMPLES C & D

Rolls of two-ply composite PVB sheeting with $R_z$ values between 23.4–30.1 micrometers and $S_m$ values between 37.2–40.4 micrometers prepared according to the process as described in FA-0782 were tested on manual and automated unwinding equipment. The separation force of these multi-ply rolls was tested according to Method 1 at three positions across the web with bonding strengths ranging from 0.2–25.2 Newtons per meter of sheeting width.

Unwinding on manual equipment was successful without separation of the plies. However, unwinding on automatic equipment was unsuccessful with separation of the plies occurring. Results are summarized in Table 2.

TABLE 2

| Example | Unwinding Equipment | Bonding, N/m | Processing |
| --- | --- | --- | --- |
| 3 | Manual | 90–150 | Passed |
| 4 | Automatic | 90–150 | Passed |
| C | Manual | 0.6–6.6 | Passed |
| D | Automatic | 0.2–25.2 | Failed |

EXAMPLES 5–8 AND COMPARATIVE EXAMPLES E–H

To 33×33 cm pieces of melt fracture PVB with a $R_z$ values of 28.5 or 38.0 micrometers and a $S_m$ value of 41.2 or 38.8 micrometers respectively was added a single water drop of varying volume as above. A second piece of PVB was placed on top and then a piece of glass as above. The size of the drop, measured in millimeters, was recorded After conditioning, the samples were tested for bonding strength according to Method 1.

The results shown in Table 3 show that as the depth of the valley increases, the size of the water drop for a given volume decreases, thereby, softening a smaller contact area and reducing bonding strength.

TABLE 3

| Example | Sheeting $R_z$ micrometers | Sheeting $S_m$ micrometers | Drop Volume micro-liters | Drop Size millimeters | Separating Force, kilograms |
| --- | --- | --- | --- | --- | --- |
| 5 | 28.5 | 41.2 | 5 | 10 | 3 |
| E | 38.0 | 38.8 | 5 | 0 | 0 |
| 6 | 28.5 | 41.2 | 10 | 21 | 5 |
| F | 38.0 | 38.8 | 10 | 4 | 0 |
| 7 | 28.5 | 41.2 | 15 | 25 | >5 |
| G | 38.0 | 38.8 | 15 | 8 | 1 |
| 8 | 28.5 | 41.2 | 20 | 31 | >5 |
| H | 38.0 | 38.8 | 20 | 9 | 1 |

EXAMPLES 9–19 AND COMPARATIVE EXAMPLES I–L

Samples of PVB sheeting with different types of surface patterns and different levels of roughness, sold under the trade names Butacite® (DuPont), Saflex® (Solutia) and S-Lec® (Sekisui), were cut into strips 2.54 cm wide×15.24 cm long. To one strip mounted on double stick tape on a glass slide was applied one drop of water using a micro-liter syringe, such as are sold by Hamilton. A second strip of the same PVB was immediately placed on top. To some samples, a piece of glass was placed on top of the construction to simulate roll winding or nip forces. The sample units were conditioned for 20 hours at 10 degrees C.

The samples were tested according to Method 2 and the separation force measured in grams then converted to Newtons per meter of sheet width.

The results show that when the surface roughness, $R_z$, is greater than 50 micrometers, little or no bonding occurs with serrated pattern being the worst However when the surface roughness, $R_z$, is less than 50 micrometers, adhesion with all surface pattern types is achieved.

Results are summarized in Table 4.

TABLE 4

| Example | PVB Type | Pattern Type | $R_2$, micrometers | $S_m$, micrometers | Drop Size L | External Pressure | Separation Force, N/m |
|---|---|---|---|---|---|---|---|
| 9 | Butacite ® | Melt Fracture | 30.0 | 43.8 | 2.5 | No | 7.25 |
| 10 | Butacite ® | Melt Fracture | 30.0 | 43.8 | 5.0 | No | 6.18 |
| 11 | Butacite ™ | Melt Fracture | 30.0 | 43.8 | 5.0 | Yes | 4.94 |
| 12 | Butacite ® | Melt Fracture | 30.0 | 43.8 | 10.0 | Yes | 3.44 |
| 13 | Butacite ® | Melt Fracture | 57.0 | 2.0 | 5.0 | Yes | 1.27 |
| 14 | Butacite ® | Melt Fracture | 30.0 | 43.8 | Nip | Yes | 0.31 |
| 16 | Butacite ® | Melt Fracture | 57.0 | 34.6 | Nip | Yes | 0 |
| 15 | S-Lec ® | Embossed | 35.0 | 25.3 | 2.5 | No | 2.86 |
| 16 | S-Lec ® | Embossed | 35.0 | 25.3 | 5.0 | Yes | 3.55 |
| 17 | S-Lec ® | Embossed | 35.0 | 25.3 | 10.0 | Yes | 2.16 |
| J | S-Lec ® | Embossed | 35.0 | 25.3 | Nip | Yes | 0 |
| 18 | Saflex ® | Melt Fracture | 57.4 | 76.1 | 5.0 | Yes | 0.31 |
| 19 | Saflex ® | Serrated | 44.2 | 21.2 | 10.0 | Yes | 0.35 |
| K | Saflex ® | Serrated | 56.2 | 18.2 | 2.5 | No | 0 |
| L | Saflex ® | Serrated | 56.2 | 18.2 | Nip | Yes | 0 |

What is claimed is:

1. A process for producing multi-ply polyvinyl butryal sheeting comprising overlaying a layer of PVB sheeting having an array of water drops on its surface with a second layer of PVB sheeting.

2. A process according to claim 1 wherein the water drops are applied by a dosing apparatus wherein the drop array is controlled by the number of dosing units and a controlled frequency of application.

3. A product comprised of multi-layer sheeting interlayer for the production of laminated safety glass wherein the sheeting is produced according to the process of claim 1 and wherein the separation force between the layers of PVB sheeting is from about 2 to about 150 Newtons per meter of sheet width.

4. A product according to claim 3 wherein each of the multiple layers of interlayer sheeting have a ten-point peak height average of between 15 and 50 micrometers.

5. A laminated safety glass construction comprising at least two pieces of glass and a multi-layer sheeting interlayer produced according to the process of claim 1.

* * * * *